UNITED STATES PATENT OFFICE.

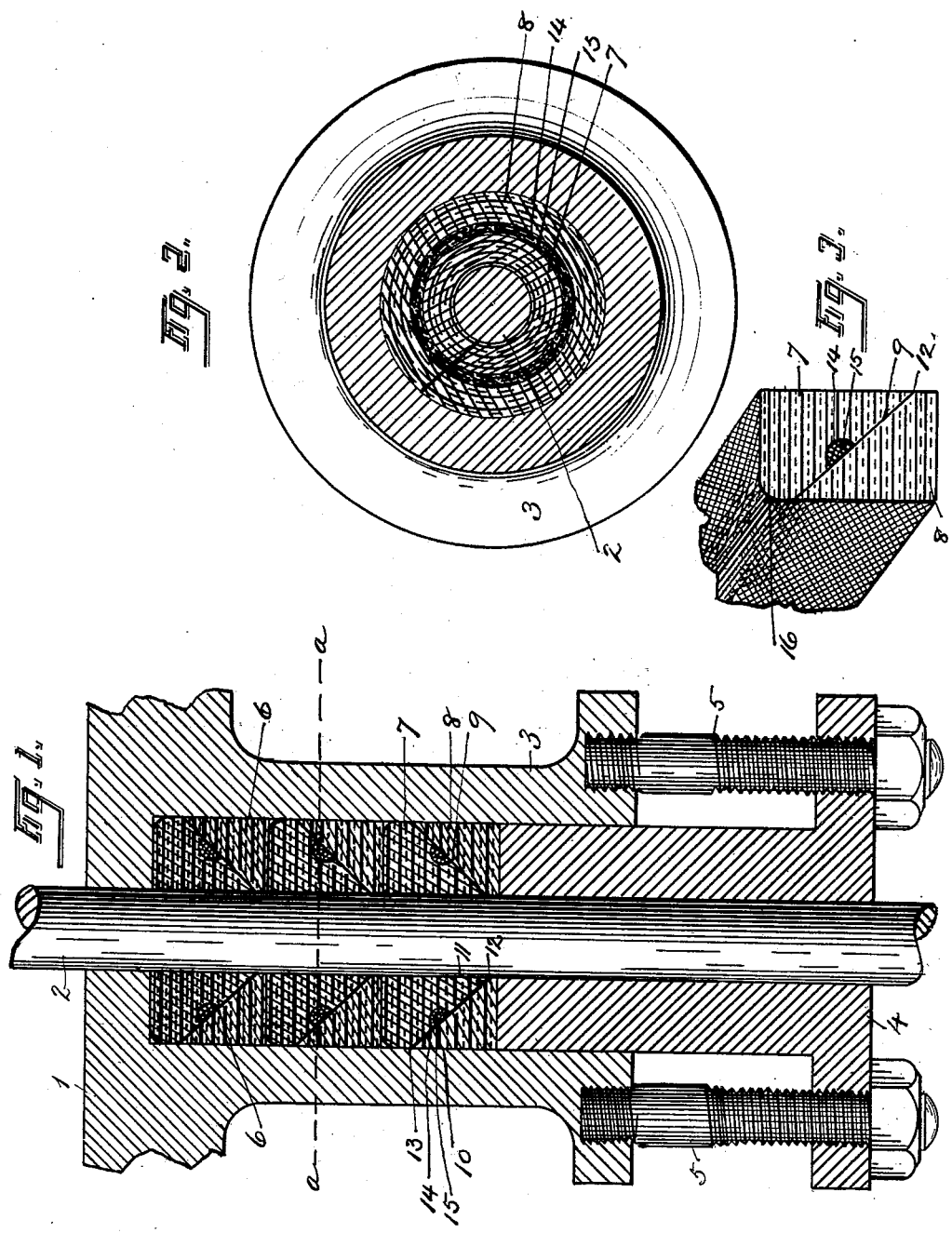

MORRIS E. BRIGGS, OF ALAMEDA, CALIFORNIA, ASSIGNOR OF TWO-THIRDS TO WILLIAM FULTON, OF SAN LEANDRO, AND HOWLAND K. MOULTHROP, OF SAN FRANCISCO, CALIFORNIA.

PISTON-ROD PACKING.

SPECIFICATION forming part of Letters Patent No. 646,797, dated April 3, 1900.

Application filed January 13, 1900. Serial No. 1,384. (No model.)

*To all whom it may concern:*

Be it known that I, MORRIS E. BRIGGS, a citizen of the United States, residing at Alameda, in the county of Alameda and State of California, have invented certain new and useful Improvements in Piston-Rod Packing, of which the following is a specification.

My invention relates to an improved piston-rod packing, the object of my invention being to provide a packing which shall be self-lubricating.

My invention, therefore, resides in the novel construction, combination, and arrangement of parts for the above ends hereinafter fully specified, and particularly pointed out in the claim.

In the accompanying drawings, Figure 1 is a section of a stuffing-box of a piston-rod with the packing in position therein. Fig. 2 is a horizontal section on the line $a$ $a$ of Fig. 1, and Fig. 3 is a perspective view of the end of a piece of the packing.

Referring to the drawings, 1 represents the cylinder-head, 2 the piston-rod, and 3 the stuffing-box. 4 is the gland, secured by bolts 5. 6 represents rings of my improved packing in position in said stuffing-box, one over the other. Each ring comprises two annular wedges—an inner wedge 7 and an outer wedge 8. The surface of cleavage 9 does not follow the diagonal of the oblong, but, as shown in Fig. 1, cuts both the outer cylindrical surface 10 and the inner cylindrical surface 11 of the packing-ring. It cuts the inner surface of the ring slightly above the lower inner edge of said ring, as shown at 12, and it cuts the outer surface of the ring a somewhat-greater distance below the upper outer edge of said ring, as shown at 13. The advantage of this construction is that the packing-rings may now be set close together, one above the other, for now a considerable space intervening between the upper edge of the outer wedge and the lower annular surface of the ring next above it is left for said outer wedge to advance as the inner wedge is worn. In connection with this construction I provide a superior arrangement of the lubricating material. In the oblique face 9 of the inner wedge is formed an annular groove 14, and in said groove is contained a ring 15 of lubricating material composed of strands of hemp or other fibrous material saturated with a lubricant that will not easily liquefy by heat, so that its action will be very gradual. The advantage of this construction is that said lubricant in addition to lubricating the piston-rod now permits the coengaging surfaces of the wedges to slide easily upon each other when the packing is adjusted for wear, and thus when such adjustment is made the pressure of the gland on all the packing-rings is substantially uniform and all of said rings are compressed to substantially the same extent.

In order to permit the packing to be readily inserted in the stuffing-box, the upper outer edge of the inner wedge is rounded, as shown at 16.

I claim—

A ring packing for piston-rods comprising two wedges having abutting oblique faces and lubricating material contained in a recess in one of said faces, substantially as described.

In witness whereof I have hereunto set my hand in the presence of two subscribing witnesses.

M. E. BRIGGS.

Witnesses:
 FRANCIS M. WRIGHT,
 H. K. MOULTHROP.